United States Patent [19]

Tsukuma et al.

[11] Patent Number: 4,774,041

[45] Date of Patent: Sep. 27, 1988

[54] HIGH-STRENGTH ZIRCONIA TYPE SINTERED BODY AND PROCESS FOR PREPARATION THEREOF

[75] Inventors: Koji Tsukuma, Atsugi; Kuniyoshi Ueda, Machida; Takaaki Tsukidate, Hino, all of Japan

[73] Assignee: Toyo Soda Manufacturing Co. Ltd., Shinnanyo, Japan

[21] Appl. No.: 704,037

[22] Filed: Feb. 21, 1985

Related U.S. Application Data

[62] Division of Ser. No. 661,968, Oct. 17, 1984, Pat. No. 4,587,225.

[30] Foreign Application Priority Data

| Oct. 17, 1983 | [JP] | Japan | 58-192470 |
| Apr. 12, 1984 | [JP] | Japan | 59-71829 |
| Apr. 25, 1984 | [JP] | Japan | 59-82019 |
| May 7, 1984 | [JP] | Japan | 59-89272 |

[51] Int. Cl.$^4$ .............................................. C04B 35/48
[52] U.S. Cl. ........................................ 264/56; 264/65; 264/66; 264/570
[58] Field of Search ............... 501/103, 104, 105, 120, 501/128, 153, 107; 264/65, 570, 56, 66

[56] References Cited

U.S. PATENT DOCUMENTS

| 4,108,652 | 8/1978 | Ogawa et al. | 264/325 |
| 4,221,650 | 9/1980 | Friese et al. | 204/195 S |
| 4,314,827 | 2/1982 | Leitheiser et al. | 51/298 |
| 4,316,964 | 2/1982 | Lange | 501/105 |
| 4,336,339 | 6/1982 | Okumiya | 501/105 |
| 4,383,957 | 5/1983 | Yamakawa | 264/65 |
| 4,461,843 | 7/1984 | McGarvy et al. | 501/105 |
| 4,506,024 | 3/1985 | Claussen et al. | 501/103 |
| 4,518,397 | 5/1985 | Leitheiser et al. | 51/309 |
| 4,518,398 | 5/1985 | Tanaka et al. | 51/309 |
| 4,543,341 | 9/1985 | Barringer et al. | 501/105 |

FOREIGN PATENT DOCUMENTS

2810134 10/1979 Fed. Rep. of Germany ...... 501/105

OTHER PUBLICATIONS

Lange, Transformation Toughening, In Journal of Materials Science, 17(1982) 247–254.

*Primary Examiner*—James Derrington
*Attorney, Agent, or Firm*—Cushman, Darby & Cushman

[57] ABSTRACT

A zirconia type sintered body consisting essentially of 50 to 98% by weight of zirconia ($ZrO_2$) containing 1.5 to 5 mole % of yttria ($Y_2O_3$) and 50 to 2% by weight of alumina ($Al_2O_3$), spinel ($MgAl_2O_4$) or mullite ($3Al_2O_3 \cdot 2SiO_2$), and having a three-point bending strength of at least 1700 MPa is provided. This sintered body is prepared by a process wherein a powdery composition consisting essentially of 50 to 98% by weight of (a1) a powder of zirconia containing 1.5 to 5 mole % of yttria or (a2) a mixture comprising 1.5 to 5 mole % of yttria powder and 95 to 98.5 mole % of a zirconia powder and 2 to 50% by weight of (b) a powder of an alumina type oxide selected from alumina, and alumina-magnesia type oxide, an alumina-silica type oxide, a mixture of alumina and magnesia and a mixture of alumina and silica is subjected to a hot isotactic pressing treatment under a pressure of at least 50 MPa at temperature of 1300° C. to 1700° C. or a monoaxially compression-sintering treatment under a pressure of at least 20 MPa at a temperature of 1400° C. to 1700° C.

9 Claims, 1 Drawing Sheet

X 2000

1

HIGH-STRENGTH ZIRCONIA TYPE SINTERED BODY AND PROCESS FOR PREPARATION THEREOF

This is a division of application Ser. No. 661,968 filed Oct. 17, 1984, now U.S. Pat. No. 4,587,225.

BACKGROUND OF THE INVENTION

(1) Field of the Invention

The present invention relates to a high-strength zirconia type sintered body composed of zirconia-alumina ($ZrO_2$—$Al_2O_3$), zirconia-spinel ($ZrO_2$—$MgAl_2O_4$) or zirconia-mullite ($ZrO_2$—$3Al_2O_3.2SiO_2$), and a process for the preparation thereof.

(2) Description of the Prior Art

Recently, developments for utilizing a zirconia sintered body of the tetragonal system containing a small amount of $Y_2O_3$ as a stabilizer (hereinafter referred to as "Y—PSZ" for brevity) as a mechanical construction material such as cutting tools, dies, nozzles and bearings have been vigorously carried out, because Y-PSZ exhibits a high strength and a high toughness. The sintered body of the present invention has extremely excellent strength characteristics promising a broadening of its use as a mechanical construction material and an increase of the reliability and durability of the sintered body when used as a mechanical construction material.

Y—PSZ is well-known as a high-strength sintered body, and it is considered that the high strength of this sintered body is due to the fact that zirconia of the tetragonal system contained in the sintered body is converted to the monoclinic system by the martensite type transition under stress. The inventors examined in detail the strength characteristics of Y—PSZ, and as the result, it has been found that the strength is not proportional to the quantity of zirconia of the tetragonal system but that the highest strength is obtained when a small amount of a cubic crystal is contained in addition to the tetragonal crystal.

From this finding, the inventors presumed that if alumina ($Al_2O_3$), spinel ($MgAl_2O_4$) or mullite ($3Al_2O_3.2SiO_2$) having higher elastic modulus and strength is incorporated instead of part of zirconia of the cubic system, the strength will further be improved. A sintered body of the Y—PSZ—$Al_2O_3$ type was already reported [Journal of Material Science, 17, 247–254 (1982)]. However, the reported bending strength of a hot-pressed sintered body is not so high as 1200 MPa and is lower than the bending strength of hot-pressed Y—PSZ (1300 to 1600 MPa), and the teaching of the prior art reference appears contradictory to the above presumption. However, the strength of the sintered body depends greatly on the starting material and the preparation process.

SUMMARY OF THE INVENTION

It is a primary object of the present invention to provide a zirconia type sintered body having highly improved mechanical strength characteristics over Y—PSZ.

Another object of the present invention is to provide a process for preparing a zirconia type sintered body having excellent mechanical strength characteristics industrially advantageously.

In accordance with one aspect of the present invention, there is provided a zirconia type sintered body consisting essentially of 50 to 98% by weight of zirconia ($ZrO_2$) containing 1.5 to 5 mole % of yttria ($Y_2O_3$) and 50 to 2% by weight of alumina ($Al_2O_3$), spinel ($MgAl_2O_4$) or mullite ($3Al_2O_3.2SiO_2$), said sintered body having a mean three-point bending strength of at least 1700 MPa.

In accordance with one preferred embodiment of the present invention, this sintered body is a zirconia-alumina type sintered body having the following properties: (1) the crystal phase of zirconia constituting the sintered body is composed mainly of a tetragonal crystal or tetragonal and cubic crystals, (2) the average grain size of the crystal of the sintered body is not larger than 2 $\mu$m, (3) the bulk density of the sintered body is at least 99.5% of the theoretical density and (4) the sintered body does not contain therein pores having a size of 30 $\mu$m or more.

In accordance with another aspect of the present invention, there is provided a process for the preparation of a zirconia type sintered body which comprises isostatically hot-pressing a powdery composition consisting essentially of 50 to 98% by weight of (a1) a powder of zirconia containing 1.5 to 5 mole % of yttria or (a2) a mixture comprising 1.5 to 5 mole % of a yttria powder and 95 to 98.5 mole % of a zirconia powder and 2 to 50% by weight of (b) a powder of an alumina type oxide selected from alumina, an alumina-magnesia type oxide, an alumina-silica type oxide, a mixture of alumina and magnesia and a mixture of alumina and silica under a pressure of at least 50 MPa at a temperature of 1300° C. to 1700° C.

In accordance with still another aspect of the present invention, there is provided a process for the preparation of a zirconia type sintered body, which comprises monoaxially compression-sintering a powdery composition consisting essentially of 50 to 98% by weight of (a1) a powder of zirconia containing 1.5 to 5 mole % of yttria or (a2) a mixture comprising 1.5 to 5 mole % of a yttria powder and 95 to 98.5 mole % of a zirconia powder and 2 to 50% by weight of (b) a powder of an alumina type oxide selected from alumina, an alumina-magnesia type oxide, an alumina-silica type oxide, a mixture of alumina and magnesia and a mixture of alumina and silica under a pressure of at least 20 MPa at a temperature of 1400° to 1700° C.

In accordance with still another aspect of the present invention, there is provided a process for the preparation of a zirconia type sintered body, which comprises adding ammonium carbonate to an aqueous solution containing (a) zirconium, (b) yttrium as a stabilizer and (c) aluminum, aluminum and magnesium, or aluminum and silicon, these elements being in the form of salts, organic metal compounds or oxides of these elements, thermally decomposing the formed precipitate to obtain a zirconia type powder, and subjecting the obtained powder to a hot isostatic pressing treatment under a pressure of at least 50 MPa at a temperature of 1300° to 1700° C.

DETAILED DESCRIPTION OF THE PREFERRED EMBODIMENTS

Figure 1:
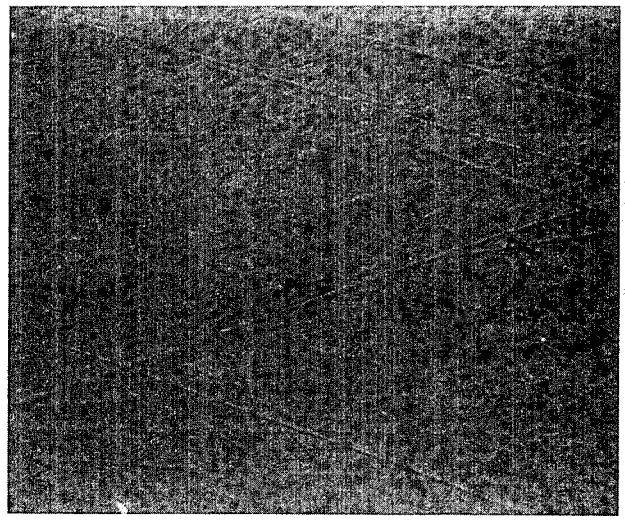
FIG. 1 is a scanning electron microscope photograph (2000 magnifications) of the surface of a zirconia type sintered body according to the present invention.

The sintered body of the present invention consists essentially of 50 to 98% by weight of zirconia containing 1.5 to 5 mole % of $Y_2O_3$ as a stabilizer and 50 to 2% by weight of alumina, spinel or mullite.

If the $Y_2O_3$ content in zirconia is lower than 1.5 mole %, a sintered body of the desired tetragonal system cannot be obtained. If the $Y_2O_3$ content exceeds 5 mole %, the content of the tetragonal system is reduced and the sintered body is composed mainly of the cubic system, thus an increase of the strength by the transition cannot be attained.

The stabilizer may contain a small amount of an alkaline earth metal oxide such as magnesia or calcia or an lanthanum type rare earth metal oxide such as ceria or dysprosium oxide in addition to yttria.

If the amount of alumina, spinel or mullite incorporated with zirconia is smaller than 2% by weight, the effect of increasing the strength by the addition of alumina, spinel or mullite is very minor. If the amount of alumina, spinel or mullite exceeds 50% by weight, the strength-increasing mechanism due to zirconia of the tetragonal system is reduced and an expected improvement of the strength cannot be attained.

The alumina, spinel and mullite to be incorporated with zirconia may be used either alone or in combination.

It is indispensable that the sintered body of the present invention have a three-point bending strength of at least 1700 MPa. A sintered body having an average bending strength of at least 1700 MPa has not been reported and it is considered that this sintered body has extremely excellent in the mechanical strength characteristics. Usually, the three-point bending strength can be raised to about 2700 MPa. The three-point bending strength referred to in the instant specification and appended claims is one determined according to the method JIS R-1601-1981; that is, the strength at which a test piece having a width of 4 mm, a thickness of 3 mm and a length of 40 mm is broken when it is bent at a span length of 30 mm and a crosshead speed of 0.5 mm/min.

A preferred zirconia type sintered body is a zirconia-alumina type sintered body having the following properties. First, the crystal phase of zirconia of the preferred sintered body is composed mainly of the tetragonal system or a mixture of the tetragonal and cubic systems (usually, the content of the cubic system in the mixture is up to 50%). The presence of the monoclinic system is permissible if its content is not larger than 30% by weight. The measurement of the content of the monoclinic system is performed by the X-rey diffractometry, and the content (% by weight) of the monoclinic system is represented by the intensity ratio expressed by the following formula:

$$\frac{M<111>+M<11\bar{1}>}{M<111>+M<11\bar{1}>T<111>+C<111>}$$

wherein M<111> stands for the X-ray diffraction intensity of the monoclinic <111> plane, M<11$\bar{1}$> represents the X-ray diffraction intensity of the monoclinic <11$\bar{1}$> plane, T<111> stands for the X-ray diffraction intensity of the tetragonal <111> plane, and C<111> represents the X-ray diffraction intensity of the cubic <111> plane.

Second, the average grain size of the preferred sintered body is not larger than 2 μm, usually in the range of about 0.05 μm to 2 μm. If the grain size exceeds 2 μm, the thermal stability is reduced, and if the sintered body is held at a temperature lower than 500° C., for example, at a relatively low temperature of 200° C. to 300° C., for a long time, cracks are formed in the sintered body by expansion of the volume caused by the transition of the tetragonal system to the monoclinic system. An especially preferred sintered body should not contain aggregates of alumina particles at all.

Third, the bulk density of the preferred sintered body is at least 99.5% of the theoretical density, and fourth, the preferred sintered body does not contain therein pores having a size larger than 30 μm. If the bulk density is lower than 99.5% of the theoretical density or the sintered body contains pores having a size larger than 30 μm, the sintered body does not exhibit generally a strength of at least 1700 MPa. The bulk density can be approximately the same as the theoretical density.

The average grain size and theoretical density of the sintered body, referred to in the instant specification and appended claims are those determined according to the following methods.

A sintered body having a mirror-polished surface is etched and the etched surface is observed by a scanning type electron microscope, and the average grain size is calculated according to the following formula:

$$\bar{\gamma} = 3/2\bar{l}$$

wherein $\bar{\gamma}$ stands for the average grain size and l stands for an average length of more than 50 grains crossing an optionally drawn line segment.

The theoretical density (ρt) is calculated according to the following formula:

$$\rho t = \left( \rho z \times \frac{Vz}{100} + \rho a \times \frac{Va}{100} \right)$$

wherein ρz stands for the theoretical density of zirconia, which is represented by the following formula:

$$\rho z = \left( 6.10 - 0.085 \times \frac{x - 1.5}{4.5} \right) \times (1 + 0.004y)$$

in which x stands for the content (mole %) of $Y_2O_3$ and y stands for the content (% by weight) of $HfO_2$ in $ZrO_2$, ρa stands for the theoretical density of alumina, which is 3.98, Vz stands for the content (% by volume) of zirconia, and Va stands for the content (% by volume) of alumina.

FIG. 1 is a scanning electron microscope photograph of the mirror-polished surface of the zirconia type sintered body of the present invention, which illustrates the dispersion states and grain sizes of zirconia and alumina grains. In the photograph, zirconia grains are white grains which can be discriminated from black grains of alumina. As is readily understood from this photograph, the dispersion states of the zirconia and alumina particles are very good and the grain size is very small, and therefore, the zirconia type sintered body has a higher strength than the conventional product.

The zirconia type sintered body of the present invention can be prepared according to several processes.

The first process comprises isostatically hot-pressing (hereinafter referred to as "HIP" for brevity) a powdery composition consisting essentially of 50 to 98% by weight of (a1) a powder of zirconia containing 1.5 to 5 mole % of yttria or (a2) a mixture comprising 1.5 to 5 mole % of a yttria powder and 95 to 98.5 mole % of a zirconia powder and 2 to 50% by weight of (b) a powder of an alumina type oxide selected from alumina, an alumina-magnesia type oxide, an alumina-silica type oxide, a mixture of alumina and magnesia and a mixture of alumina and silica. The second process comprises monoaxially compression-sintering the powdery composition described above.

In the above-mentioned first and second processes, it is preferred that the starting powdery composition be finely divided. More specifically, it is preferred that the average primary particle size of the zirconia powder or the yttria-containing zirconia powder be not larger than 0.1 $\mu$m and that the average primary particle size of yttria be not larger than 0.5 $\mu$m. If the average primary particle size of the zirconia powder or yttria-containing zirconia is larger than 0.1 $\mu$m or the average primary particle size of the yttria powder is larger than 0.5 $\mu$m, it is difficult to obtain a sintered body having a strength of at least 1700 MPa. It is especially preferred that the average primary particle size of the starting powder be in the range of from 200 to 400 angstroms. The starting powder is obtained in the form of a zirconia powder free of yttria as a stabilizer or a powder of zirconia containing yttria as a stabilizer from an aqueous solution of a salt or alkoxide of zirconium optionally with a salt or alkoxide of yttrium by the neutralization or hydrolysis method. A stabilizer powder obtained by the above method or a stabilizer powder obtained by finely divided yttrium oxide may be used.

As the alumina type oxide powder, there can be mentioned an alumina powder, an alumina-magnesia type oxide powder (for example, spinel, $MgAl_2O_4$), an alumina-silica type oxide powder (for example, mullite, $3Al_2O_3 \cdot 2SiO_2$), a powdery mixture of alumina and magnesia and a powdery mixture of alumina and silica. It is preferred that each oxide powder should have an average primary particle size not larger than 0.5 $\mu$m. In the case of alumina, an $\alpha$-alumina powder having a specific surface area smaller than 20 $m^2/g$ and an average primary particle size of 0.2 to 0.4 $\mu$m is especially preferred. It is especially preferred that a spinel powder obtained by co-precipitation or the like be used as the alumina-magnesia type oxide. A powder mixture of an alumina powder and a magnesia powder also can be used. As the alumina-silica type oxide, a mullite powder obtained by co-precipitation or the like is preferably used, but a powdery mixture of an alumina powder and a silica powder also can be used.

Since the sintered body of the present invention should contain zirconia as the stabilizer, as the method for mixing starting powders, there are adopted (a) a method in which a powder of zirconia containing yttria as the stabilizer is mixed with a powder of an alumina type oxide, and (b) a method in which a zirconia powder is mixed with a powder of yttria as the stabilizer and a powder of an alumina type oxide.

In these mixing methods, the starting powders should be homogeneously dispersed. For this purpose, there may be adopted a wet-mixing method in which mixing is carried out in a ball mill by using water or alcohol as a solvent. A method using a finely divided powder prepared from an aqueous solution containing zirconium and aluminum by co-precipitation is considered to be preferable.

As means for examining the dispersion states of the starting powders in the obtained powdery mixture, there can be mentioned, for example, a method in which the powdery mixture is formed into a molded article, the molded article is sintered, the surface of the sintered body is mirror-polished and the polished surface is observed by a scanning type electron microscope.

As the method for the HIP treatment, there can be mentioned a method in which a molded powder of the powdery mixture is vacuum-sealed in a capsule made of glass or metal and then the powder is press-sintered, and a method in which a molded powder of the powdery mixture is preliminarily sintered and the powder is then press-sintered. The latter method is preferred because the operation of sealing the powder into a capsule is not necessary and the productivity is high.

The preliminarily sintered body to be subjected to the HIP treatment should have a relative density of at least 90% and an average particle size not larger than 1.5 $\mu$m and should not contain open pores. If the relative density is lower than 90%, open pores are left in the sintered body and sufficient densification cannot be attained by the HIP treatment. If the average particle size exceeds 1.5 $\mu$m, large voids formed by the growth of grains cannot be removed even by the HIP treatment and a satisfactory strength cannot be obtained.

If the preparation of the alumina type oxide is smaller than 20% by weight, the preliminary sintering is preferably carried out at a temperature not higher than 1400° C. If the proportion of the alumina type oxide exceeds 20% by weight, the preliminary sintering is preferably carried out at a temperature not higher than 1500° C. This is because a sintered body obtained at a high sintering temperature exceeding 1400° C. or 1500° C. contains grown closed pores and these pores cannot be sufficiently removed by the HIP treatment. Accordingly, it is important that the preliminary sintering should be carried out at a temperature as low as possible, which is not higher than 1500° C.

There may also be adopted a method in which fine powders of zirconia and alumina or spinel are vacuum-sealed in a glass or metal capsule and then subjected to the HIP treatment.

The HIP treatment is carried out under a pressure of at least 50 MPa, ordinarily 50 to 500 MPa, and at a temperature of 1300° to 1700° C. If the pressure is lower than 50 MPa or the temperature is lower than 1300° C., it is almost difficult to obtain a sintered body having an expected high strength. If the temperature exceeds 1700° C., a high strength can be obtained, but, since grains of the sintered body grow beyond a grain size of 1 $\mu$m, if the sintered body is held at 200° C. to 300° C. for a long time, the sintered body is thermally unstable and cracks are readily formed. Accordingly, this sintered body is not suitable as an industrial material.

The second preparation process comprises monoaxially compression-sintering the above-mentioned powdery composition at a temperature of 1400° C. to 1700° C. under a pressure of at least 20 MPa, preferably 20 MPa to 100 MPa. If these temperature and pressure conditions are not satisfied, an intended sintered body cannot be obtained.

The third process for preparing the zirconia type sintered body of the present invention comprises adding ammonium carbonate to an aqueous solution containing (a) zirconium, (b) yttrium as a stabilizer and (c) aluminum, aluminum and magnesium, or aluminum and silicon, these elements being in the form of salts, organic metal compounds or oxides of these elements, thermally decomposing the formed precipitate to obtain a zirconia type powder and subjecting the obtained powder to the HIP treatment.

As the starting compounds, there can be used chlorides such as zirconium oxychloride, aluminum chloride, magnesium chloride and yttrium chloride, and nitrates and sulfates. Furthermore, an oxide of the stabilzer or an oxide of silicon can be used. These starting compounds are dissolved in water in amounts selected so that a sintered body having the above-mentioned composition can be obtained, whereby the starting aqueous solution is formed.

Ammonium carbonate may be added as it is, but it is preferred that ammonium carbonate be added in the form of an aqueous solution. As means for adding ammonium carbonate, there is preferably adopted a method in which ammonium carbonate be added at one time to the starting aqueous solution with violent stirring so that the pH value of the solution is about 9.

For the thermal decomposition, there is preferably adopted a method in which the precipitate formed by the addition of ammonium carbonate is separated and dried and the dried precipitate is thermally decomposed in an air atmosphere at 900° C. to 1150° C. If the thermal decomposition is carried out at a temperature exceeding 1150° C., strong bonding is formed among powder grains and a powder having excellent sintering property cannot be obtained.

According to the third process of the present invention, since the precipitate contains carbonic acid radicals and these carbonic acid radicals are violently gasified at the thermal decomposition step, a zirconia powder in which cohesion among powder grains and so-called second agglomeration is weak is obtained.

It is preferred that the average primary particle size of the zirconia powder be not larger than 0.1 μm.

The zirconia type powder obtained according to the above-mentioned process provides a sintered body quite different from a sintered body prepared from a powder obtained by evaporating to dryness an aqueous solution containing metal ions of the respective components and thermally decomposing the solid or by forming a powder by adding aqueous ammonia to the above-mentioned aqueous solution and thermally decompositing the formed precipitate. More specifically, the powder obtained according to the third process of the present invention provides a dense sintered body having a bulk density of at least 98% of the theoretical density under atmospheric pressure at a sintering temperature of 1400° C. In contrast, the powder obtained according to the above-mentioned other method provides a sintered body having a bulk density lower than 95% of the theoretical density and containing many crack-like voids. These crack-like voids cause drastic reduction of the strength of the sintered body. Accordingly, if sintering is carried out under atmospheric pressure, the powder of the present invention provides a sintered body having a bending strength of at least 1000 MPa, while the powder obtained according to the above-mentioned other method merely provides a sintered body having a bending strength of about 600 MPa.

The zirconia powder obtained by the thermal decomposition is subjected to the HIP treatment. The HIP treatment may be carried out in the same manner as described above with respect to the first process.

The proportion of salts, organic compounds or oxides of the respective elements used in the third process may be selected so that the proportion is in agreement with the above-mentioned composition of the zirconia type sintered body of the present invention finally obtained.

When compounds of aluminum and magnesium are used as the starting compounds, an alumina-magnesia type oxide is present as the crystal phase composed mainly of spinel in the zirconia type sintered body. If compounds of aluminum and silicon are used as the starting compounds, an alumina-silica type oxide is present as the crystal phase composed mainly of mullite in the sintered body.

In case of conventional Y-PSZ sintered bodies or composite sintered bodies comprising zirconia and other ceramics, the mechanical properties are degraded at high temperatures. More specifically, a highest bending strength at a high temperature, heretofore reported with respect to those known sintered bodies, does not reach 500 MPa at 1000° C. It has been considered that zirconia type sintered body are defective in that the mechanical strength is drastically degraded at a high temperature.

In contrast, the sintered body of the present invention has a three-point bending strength of 900 to 1000 MPa at 1000° C. This excellent strength of the sintered body of the present invention at a high temperature is due to a high strength at room temperature.

Among sintered bodies of the present invention, a sintered body of the present invention obtained by incorporating 10 to 30% by weight of alumina with zirconia containing 2 to 3 mole % of $Y_2O_3$ and subjecting the resulting composition to the HIP treatment is especially excellent in the strength characteristics and has a very high average bending strength of 2000 to 2500 MPa. This value is about 2 times the value of the sintered body obtained without performing the HIP treatment.

The sintered body of the present invention is highly improved in the strength at a high temperature, and it is expected that a new use as a high-temperature machine material such as engine parts will be developed for this material.

Furthermore, since the zirconia type sintered body of the present invention has made excellent strength characteristics than the conventional products, the sintered body of the present invention can be effectively used as a mechanical structural material for a cutting tool, a die, a nozzle or a bearing, especially in the field where especially high strength and durability are required.

The present invention will now be described in detail with reference to the following examples that by no means limit the scope of the invention.

EXAMPLE 1

A powder of Y—PSZ containing 1.5 to 5 mole % of $Y_2O_3$ and having a primary particle size of 230 angstroms, which was obtained by co-precipitation, was wet-mixed in ethanol for 24 hours with a high-purity (99.99%) $Al_2O_3$ powder having an average particle size of 0.4 μm or a high-purity $MgAl_2O_4$ powder having an average particle size of 0.1 μm, to obtain a predetermined composition. The mixture was then dried to obtain a starting powder. The powder was molded into a plate having a thickness of 4 mm, a width of 40 mm and a length of 56 mm according to a rubber press method. The molded plate was preliminarily sintered at 1200° C. to 1500° C. for 2 hours to form a preliminarily sintered body to be subjected to the HIP treatment. The preliminarily sintered body was subjected to the HIP treatment at 1300° C. to 1600° C. under a pressure of 50 to 200 MPa for 0.5 hour in an argon gas to obtain a zirconia type sintered body of the present invention. With respect to each of 32 sintered bodies prepared according to the above-mentioned procedures, the density and bending strength were measured (the measurement was made on at least ten samples and the average value was calculated; the same will apply in the subsequent examples). The obtained results are shown in Table 1. For comparison, a sintered body formed by subjecting a preliminarily sintered body composed solely of Y—PSZ to the HIP treatment and a sintered body of the Y—PSZ—$Al_2O_3$ type obtained without performing the HIP treatment were similarly tested. The obtained results are shown in Table 1.

the glass capsule was placed in a hot isostatic treatment apparatus, heated at 800° C. in an argon atmosphere and then compressed under 100 MPa at 1500° C. for 0.5 hour. The obtained sintered body was ground by a diamond wheel, and the bending strength was measured according to the above-mentioned method. The obtained results are shown in Table 2.

TABLE 2

| $Y_2O_3/ZrO_2$ Molar Ratio | $Al_2O_3$ (wt. %) | Preliminary Sintering Temperature (°C.) | HIP Temperature (°C.) | HIP Pressure (MPa) | Density (g/cm³) | Bending Strength (MPa) |
|---|---|---|---|---|---|---|
| 2/98 | 5 | 1400 | 1500 | 100 | 5.94 | 1770 |
| 2/98 | 10 | 1400 | 1500 | 100 | 5.72 | 2050 |
| 2/98 | 20 | 1400 | 1500 | 100 | 5.51 | 2300 |
| 2/98 | 30 | 1400 | 1500 | 100 | 5.25 | 1920 |
| 2.5/97.5 | 20 | 1400 | 1500 | 100 | 5.51 | 2010 |
| 2.5/97.5 | 40 | 1400 | 1500 | 100 | 5.00 | 1710 |

EXAMPLE 3A

A vessel was charged with 788 ml of an aqueous zirconium oxychloride solution ($ZrO_2$ concentra-

TABLE 1

| | $Y_2O_3/ZrO_2$ Molar Ratio | $Al_2O_3$ (wt. %) | $MgAl_2O_4$ (wt. %) | Preliminary Sintering Temperature (°C.) | HIP Temperature (°C.) | HIP Pressure (MPa) | Density of Sintered Body (g/cm³) | Bending Strength (MPa) |
|---|---|---|---|---|---|---|---|---|
| Products of Present Invention | 1.5/98.5 | 10 | 0 | 1400 | 1500 | 100 | 5.78 | 1780 |
| | 2/98 | 2 | 0 | 1400 | 1500 | 100 | 6.03 | 1730 |
| | " | 5 | 0 | 1400 | 1500 | 100 | 5.94 | 1790 |
| | " | 10 | 0 | 1200 | 1500 | 100 | 5.77 | 1980 |
| | " | 10 | 0 | 1300 | 1500 | 100 | 5.77 | 2010 |
| | " | 10 | 0 | 1400 | 1500 | 50 | 5.78 | 1910 |
| | " | 10 | 0 | 1400 | 1500 | 100 | 5.78 | 2200 |
| | " | 10 | 0 | 1400 | 1500 | 200 | 5.78 | 2230 |
| | " | 10 | 0 | 1400 | 1600 | 100 | 5.78 | 2310 |
| | " | 10 | 0 | 1500 | 1500 | 100 | 5.78 | 1820 |
| | " | 20 | 0 | 1400 | 1500 | 100 | 5.51 | 2510 |
| | " | 20 | 0 | 1500 | 1500 | 100 | 5.51 | 2380 |
| | " | 30 | 0 | 1400 | 1500 | 100 | 5.25 | 1900 |
| | " | 40 | 0 | 1400 | 1500 | 100 | 5.02 | 1810 |
| | " | 50 | 0 | 1400 | 1500 | 100 | 4.80 | 1700 |
| | 3/97 | 5 | 0 | 1400 | 1500 | 100 | 5.94 | 1820 |
| | " | 10 | 0 | 1200 | 1300 | 100 | 5.75 | 1710 |
| | " | 10 | 0 | 1300 | 1400 | 100 | 5.76 | 1740 |
| | " | 10 | 0 | 1400 | 1500 | 100 | 5.78 | 2010 |
| | " | 10 | 0 | 1500 | 1600 | 100 | 5.78 | 1850 |
| | " | 15 | 0 | 1400 | 1500 | 100 | 5.64 | 2050 |
| | " | 20 | 0 | 1400 | 1500 | 50 | 5.49 | 2020 |
| | " | 20 | 0 | 1400 | 1500 | 100 | 5.50 | 2160 |
| | " | 20 | 0 | 1400 | 1500 | 200 | 5.50 | 2230 |
| | 4/96 | 20 | 0 | 1400 | 1500 | 100 | 5.49 | 1920 |
| | 5/95 | 20 | 0 | 1400 | 1500 | 100 | 5.48 | 1790 |
| | 2/98 | 0 | 10 | 1400 | 1500 | 100 | 5.70 | 1750 |
| | " | 0 | 20 | 1400 | 1500 | 100 | 5.39 | 1790 |
| | " | 0 | 40 | 1400 | 1500 | 100 | 4.76 | 1700 |
| | " | 10 | 10 | 1400 | 1500 | 120 | 5.43 | 2080 |
| | " | 20 | 1 | 1400 | 1500 | 120 | 5.49 | 2470 |
| | " | 15 | 5 | 1400 | 1500 | 120 | 5.47 | 2400 |
| Comparative Products | " | 0 | 0 | 1400 | 1500 | 100 | 6.10 | 1470 |
| | 3/97 | 0 | 0 | 1400 | 1500 | 100 | 6.09 | 1650 |
| | 4/96 | 0 | 0 | 1400 | 1500 | 100 | 6.06 | 920 |
| | 2/98 | 10 | 0 | 1400 | Not effected | Not effected | 5.75 | 1070 |
| | " | 20 | 0 | 1400 | 1500 | 100 | 5.48 | 910 |
| | " | 30 | 0 | 1400 | 1500 | 100 | 5.20 | 850 |
| | " | 40 | 0 | 1400 | 1500 | 100 | 5.00 | 810 |

EXAMPLE 2

The powdery mixture of Y—PSZ and $Al_2O_3$ used in Example 1 was molded under a pressure of 3 ton/cm² into a square rod (4 mm×3 mm×56 mm) by a rubber press method. The square rod was wrapped with a metal film of molybdenum and placed in a Pyrex glass tube and vacuum-sealed therein. The molded rod set in tion=301 g/l), 560 ml of an aqueous aluminum chloride solution ($Al_2O_3$ concentration=103.5 g/l) and a solution of 9 g of yttria in hydrochloric acid, and the mixed solution was violently stirred. Then, a solution of 500 g of ammonium carbonate, $(NH_4)_2CO_3$, in 1400 ml of aqueous ammonia ($NH_3$ content=13%) was added at one time to the mixed solution. The formed precipitate was recovered by filtration, dried in a reduced pressure drier and sintered at 1000° C. for 1 hour to obtain about 300 g of a zirconia-alumina powder ($ZrO_2/Al_2O_3$ weight ratio=80/20, $ZrO_2/Y_2O_3$ molar ratio=98/2).

Powders in which the zirconia/alumina weight ratio was 98/2, 90/10 and 60/40 were prepared according to the same procedures as described above. Moreover, powders in which the $Y_2O_3$ content in $ZrO_2$ was 3 or 4 mole % were similarly prepared by changing the amount added of alumina. In order to examine the sintering property of these powders, each powder was molded according to a rubber press method and sintered at 1400° C. for 2 hours to obtain a sintered body. In each sintered body, the density was higher than 98% of the theoretical density. Thus, it was found that each powder had a good sintering property.

density of each powder was higher than 98% of the theoretical density.

EXAMPLE 3C

The powders obtained in Examples 3A and 3B were molded into plates having a thickness of 4 mm, a width of 40 mm and a length of 56 mm according to a rubber press method. Each molded plate was preliminarily sintered at 1400° C. for 2 hours to obtain a preliminarily sintered body to be subjected to the HIP treatment. The preliminarily sintered body was subjected to the HIP treatment at 1300° to 1700° C. and 50 to 200 MPa, as shown in Table 3, for 0.5 hour in an argon gas to obtain a zirconia type sintered body of the present invention. With respect to each of the thus-prepared sintered bodies, the crystal phase of $ZrO_2$, average grain size and bending strength were measured. The obtained results are shown in Table 3.

TABLE 3

| Stabilizer | Stabilizer/ $ZrO_2$ Molar Ratio | $Al_2O_3$ (wt. %) | $Al_2O_3$— MgO (wt. %) | $Al_2O_3$— $SiO_2$ (wt. %) | HIP Treatment Temperature (°C.) | Pressure (MPa) | Crystal Phase of $ZrO_2$* | Average Grain Size of $ZrO_2$ (μm) | Bending Strength (MPa) |
|---|---|---|---|---|---|---|---|---|---|
| $Y_2O_3$ | 2/98 | 2 | 0 | 0 | 1500 | 100 | T | 0.5 | 1800 |
| " | 3/97 | 2 | " | " | " | " | T + C | " | 1720 |
| " | 4/96 | 2 | " | " | " | " | " | " | 1710 |
| " | 2/98 | 10 | " | " | " | " | T | " | 2230 |
| " | 3/97 | " | " | " | 1400 | 200 | T + C | 0.2 | 2330 |
| " | 4/96 | " | " | " | 1500 | 100 | " | 0.5 | 2100 |
| " | 2/98 | 20 | " | " | " | " | T | " | 2470 |
| " | 3/97 | " | " | " | " | " | T + C | " | 2010 |
| " | 4/96 | " | " | " | " | " | " | " | 1750 |
| " | 2/98 | 40 | " | " | " | " | T | " | 1830 |
| " | 3/97 | " | " | " | 1600 | " | T + C | 0.7 | 1710 |
| " | 4/96 | " | " | " | 1700 | 50 | " | 1.0 | 1700 |
| " | 2/98 | 0 | 2 | 0 | 1500 | " | T | 0.5 | 1710 |
| " | " | " | 10 | " | " | " | " | " | 1960 |
| " | " | " | 20 | " | " | " | " | " | 2050 |
| " | " | " | 40 | " | " | " | " | " | 1730 |
| " | 2/98 | 0 | 0 | 2 | " | " | " | " | 1710 |
| " | " | " | 0 | 10 | " | " | " | " | 1830 |
| " | " | " | 0 | 20 | " | " | " | " | 1710 |
| " | 1/99 | 40 | 0 | 0 | " | " | " | " | 1830 |
| " | 5/95 | 10 | 0 | 0 | " | " | T | 0.7 | 1700 |
| " | 3/97 | 0 | 10 | 0 | " | " | T + C | 0.5 | 2010 |
| " | 3/97 | 0 | 10 | 0 | " | " | " | " | 1920 |

*T: Tetragonal system, C: Cubic system

EXAMPLE 3B

To the same mixed solution of the zirconium oxychloride solution, aluminum chloride solution and hydrochloric acid solution of $Y_2O_3$ as used in Example 3A was further added 580 ml of an aqueous magnesium chloride solution (MgO concentration=40.4 g/l). Then 1400 ml of aqueous ammonia ($NH_3$ content=12%) containing 500 g of ammonium carbonate was added to the mixed solution with stirring. The formed precipitate was recovered by filtration, dried and then sintered at 1050° C. for 1 hour to obtain about 300 g of a zirconia-spinel powder ($ZrO_2/Al_2MgO_4$ weight ratio=75/25).

A zirconia-mullite powder ($ZrO_2/3Al_2O_3.2SiO_2$ weight ratio=75/25) was prepared in the same manner as described above except that 78 ml of a silica sol solution ($SiO_2$ content=30% by weight) was added instead of the magnesium chloride solution. Powders differing in the spinel or mullite content were prepared in the same manner as described above by changing the amount of the magnesium chloride solution or silica sol solution.

The sintering property of each powder was examined according to the method described in Example 3A. The

EXAMPLE 4

A zirconia ($ZrO_2$) powder (Y—PSZ powder) containing 1.5 to 5 mole % of yttria ($Y_2O_3$) and having a primary grain size of 230 angstroms and a specific surface area of 12 m²/g, which was prepared by co-precipitation, was wet-mixed in ethanol with a high-purity (99.99%) alumina ($Al_2O_3$) powder having a primary grain size of 0.4 μm and a specific surface area of 10 m²/g, a high-purity alumina-magnesia type oxide (spinel) powder having a primary grain size of 0.3 μm and a specified surface area of 18 m²/g or a high-purity alumina-silica type oxide (mullite) having a primary grain size of 0.5 μm and a specific surface area of 15 m²/g to obtain a desired composition. The mixture was then dried to obtain a powdery mixture. The powdery mixture was molded into a plate having a thickness of 4 mm, a width of 40 mm and a length of 56 mm according to a rubber press method and the plate was preliminarily sintered at 1200° C. to 1500° C. for two hours to obtain a preliminarily sintered product to be subjected to the HIP treatment. The preliminarily sintered body was subjected to the HIP treatment at 1300° to 1700° C.

under 50 to 200 MPa for 0.5 hour in an argon gas to obtain a zirconia type sintered body of the present invention. With respect to the thus-obtained 24 sintered bodies, the density, average grain size, $ZrO_2$ crystal phase and bending strength were measured. The obtained results are shown in Table 4. For comparison, results obtained with respect to a sintered body obtained by subjecting a preliminarily sintered body composed solely of Y—PSZ to the HIP treatment and a sintered body of the Y—PSZ—$Al_2O_3$ type obtained without performing the HIP treatment are also shown in Table 4.

EXAMPLE 5

A $ZrO_2$ powder having an average primary grain size of 250 angstroms was wet-mixed for 72 hours with a $Y_2O_3$ powder having an average primary grain size of 0.3 μm, an $Al_2O_3$ powder having an average primary grain size of 0.4 μm, an MgO powder having an average grain size of 0.2 μm and an $SiO_2$ powder having an average grain size of 0.1 μm to obtain a desired composition. The obtained powder was molded and sintered in the same manner as described in Example 4 to obtain a zirconia sintered body of the present invention.

TABLE 4

| | $Y_2O_3$/$ZrO_2$ Molar Ratio | $Al_2O_3$ (wt. %) | $Al_2O_3$—MgO (wt. %) | $Al_2O_3$—$SiO_2$ (wt. %) | Preliminary Sintering Temperature (°C.) | HIP Treatment Temperature (°C.) | HIP Treatment Pressure (MPa) | Density of Sintered Body (g/cm³) | Average Grain Size (μm) | $ZrO_2$ Crystal Phase | Bending Strength (MPa) |
|---|---|---|---|---|---|---|---|---|---|---|---|
| Products of Present Invention | 1.5/98.5 | 10 | 0 | 0 | 1400 | 1500 | 100 | 5.78 | 0.5 | tetragonal | 1780 |
| | 2/98 | 2 | 0 | 0 | 1400 | 1500 | " | 6.03 | 0.5 | tetragonal | 1730 |
| | " | 10 | 0 | 0 | 1400 | 1500 | " | 5.78 | 0.5 | tetragonal | 2200 |
| | " | 20 | 0 | 0 | 1200 | 1300 | " | 5.49 | 0.1 | tetragonal | 1700 |
| | " | 20 | 0 | 0 | 1300 | 1400 | " | 5.50 | 0.2 | tetragonal | 1750 |
| | " | 20 | 0 | 0 | 1400 | 1500 | 50 | 5.51 | 0.5 | tetragonal | 2410 |
| | " | 20 | 0 | 0 | 1400 | 1500 | 100 | 5.51 | 0.5 | tetragonal | 2510 |
| | " | 20 | 0 | 0 | 1400 | 1500 | 200 | 5.51 | 0.5 | tetragonal | 2430 |
| | " | 20 | 0 | 0 | 1400 | 1600 | 100 | 5.51 | 1.0 | tetragonal | 2440 |
| | " | 20 | 0 | 0 | 1400 | 1700 | " | 5.51 | 1.9 | tetragonal | 2050 |
| | " | 30 | 0 | 0 | 1400 | 1500 | " | 5.25 | 0.5 | tetragonal | 1900 |
| | " | 40 | 0 | 0 | 1500 | " | " | 5.02 | " | tetragonal | 1810 |
| | " | 50 | 0 | 0 | 1500 | " | " | 4.80 | " | tetragonal | 1700 |
| | 3/97 | 2 | 0 | 0 | 1400 | " | " | 6.03 | " | tetragonal + Cubic | 1820 |
| | " | 20 | 0 | 0 | 1400 | " | " | 5.51 | " | tetragonal + Cubic | 2500 |
| | " | 50 | 0 | 0 | 1500 | " | " | 4.81 | " | tetragonal + Cubic | 2210 |
| | 4/96 | 20 | 0 | 0 | 1400 | " | " | 5.50 | " | tetragonal + Cubic | 1920 |
| | 5/95 | 20 | 0 | 0 | " | " | " | 5.50 | " | tetragonal + Cubic | 1790 |
| | 2/98 | 0 | 20 | 0 | " | " | " | 5.48 | " | tetragonal | 1810 |
| | " | 0 | 40 | 0 | " | " | " | 4.98 | " | tetragonal | 1760 |
| | " | 0 | 0 | 20 | " | " | " | 5.14 | " | tetragonal | 1760 |
| | " | 0 | 0 | 40 | " | " | " | 4.45 | " | tetragonal | 1710 |
| | " | 15 | 5 | 0 | " | " | " | 5.47 | " | tetragonal | 2150 |
| | " | 15 | 0 | 5 | " | " | " | 5.41 | " | tetragonal | 1970 |
| Comparative Products | 2/98 | 0 | 0 | 0 | " | " | " | 6.10 | 0.5 | tetragonal | 1470 |
| | 3/97 | 0 | 0 | 0 | " | " | " | 6.09 | 0.5 | tetragonal + Cubic | 1650 |
| | 4/96 | 0 | 0 | 0 | " | " | " | 6.06 | 0.5 | tetragonal + Cubic | 920 |
| | 2/98 | 10 | 0 | 0 | " | Not effected | Not effected | 5.75 | 0.2 | tetragonal | 1070 |
| | " | 20 | 0 | 0 | " | Not effected | Not effected | 5.48 | 0.2 | tetragonal | 910 |
| | " | 30 | 0 | 0 | " | Not effected | Not effected | 5.20 | 0.2 | tetragonal | 850 |
| | " | 40 | 0 | 0 | " | Not effected | Not effected | 5.00 | 0.2 | tetragonal | 810 |

The results of the obtained sintered bodies are shown in Table 5.

TABLE 5

| Contents (wt. %) | | | | | Preliminary Sintering Temperature (°C.) | HIP Treatment Temperature (°C.) | HIP Treatment Pressure (MPa) | Density of Sintered Body (g/cm³) | Average Grain Size (μm) | $ZrO_2$ Crystal Phase | Bending Strength (MPa) |
|---|---|---|---|---|---|---|---|---|---|---|---|
| $ZrO_2$ | $Y_2O_3$ | $Al_2O_3$ | MgO | $SiO_2$ | | | | | | | |
| 77 | 3 | 20 | 0 | 0 | 1400 | 1500 | 100 | 5.50 | 0.5 | tetragonal | 1990 |
| 76 | 4 | 20 | 0 | 0 | 1400 | 1500 | 100 | 5.49 | 0.5 | tetragonal + Cubic | 2010 |
| 76 | 4 | 15 | 5 | 0 | 1400 | 1500 | 100 | 5.46 | 0.5 | tetragonal + Cubic | 1870 |
| 76 | 4 | 15 | 0 | 5 | 1400 | 1500 | 100 | 5.14 | 0.5 | tetragonal + Cubic | 1750 |
| 76 | 4 | 17 | 2 | 1 | 1400 | 1500 | 100 | 5.46 | 0.5 | tetragonal + | 1820 |

TABLE 5-continued

| Contents (wt. %) | | | | | Preliminary Sintering Temperature (°C.) | HIP Treatment | | Density of Sintered Body (g/cm³) | Average Grain Size (μm) | $ZrO_2$ Crystal Phase | Bending Strength (MPa) |
|---|---|---|---|---|---|---|---|---|---|---|---|
| $ZrO_2$ | $Y_2O_3$ | $Al_2O_3$ | MgO | $SiO_2$ | | Temperature (°C.) | Pressure (MPa) | | | | |
| | | | | | | | | | | Cubic | |

EXAMPLE 6

The powdery mixture of the Y-PSZ powder and $Al_2O_3$ powder used in Example 4 was monoaxially compression-sintered under a pressure of 20 to 80 MPa at a temperature of 1400° to 1700° C. in the open air to obtain a sintered body of the present invention. The results of the obtained sintered bodies are shown in Table 6.

TABLE 6

| $Y_2O_3/ZrO_2$ Molar Ratio | $Al_2O_3$ (wt. %) | Hot Pressing Temperature (°C.) | Hot Pressing Pressure (MPa) | Density of Sintered Body (cm³) | Average Grain Size (μm) | $ZrO_2$ Crystal Phase | Hexural Strength (MPa) |
|---|---|---|---|---|---|---|---|
| 2/98 | 20 | 1400 | 50 | 5.49 | 0.2 | Tetragonal | 1700 |
| " | " | 1500 | 50 | 5.49 | 0.5 | Tetragonal | 1810 |
| " | " | 1600 | 20 | 5.49 | 1.0 | Tetragonal | 1890 |
| " | " | 1600 | 50 | 5.50 | 1.0 | Tetragonal | 1970 |
| " | " | 1600 | 80 | 5.50 | 1.0 | Tetragonal | 1950 |
| " | " | 1700 | 50 | 5.50 | 1.9 | Tetragonal | 1830 |

EXAMPLE 7

A powdery mixture of the same starting powders as used in Example 5 was monoaxially compression-sintered at a temperature of 1600° C. under a pressure of 50 MPa in the open air to obtain a zirconia type sintered body. The results of the thus obtained sintered bodies are shown in Table 7.

TABLE 7

| Contents (wt. %) | | | | | Density of Sintered Body (g/cm³) | Average Grain Size (μm) | $ZrO_2$ Crystal Phase | Bending Strength (MPa) |
|---|---|---|---|---|---|---|---|---|
| $ZrO_2$ | $Y_2O_3$ | $Al_2O_3$ | MgO | $SiO_2$ | | | | |
| 77 | 3 | 20 | 0 | 0 | 5.50 | 0.8 | Tetragonal | 1940 |
| 76 | 4 | 20 | 0 | 0 | 5.49 | 0.9 | Tetragonal | 1900 |
| 76 | 4 | 15 | 5 | 0 | 5.45 | 0.9 | Tetragonal | 1880 |
| 76 | 4 | 15 | 0 | 3 | 5.14 | 0.9 | Tetragonal | 1800 |
| 76 | 4 | 17 | 2 | 1 | 5.46 | 0.9 | Tetragonal | 1900 |

EXAMPLE 8

To a Y-PSZ powder having a primary grain size of 250 angstroms was added a predetermined amount of an $Al_2O_3$ powder (A) having an average grain size of 0.3 μm and a specific surface area of 20 m²/g. The powders were mixed in an alumina ball mill for 72 hours by using ethanol as a solvent to obtain a mixed powder. For comparison, a predetermined amount of an $Al_2O_3$ powder (B) having an average primary grain size of 0.6 μm and a specific surface area of 10 m²/g was added to the abovementioned Y—PSZ powder, and the mixing operation was carried out in the same manner as described above to obtain a mixed powder. The two mixed powders were molded by a rubber press and then preliminarily sintered at 1400° C. for 1 hour. The preliminarily sintered bodies were subjected to the HIP treatment under a pressure of 100 MPa at a temperature of 1500° C. for 30 minutes. The bending strength and other properties of the sintered bodies are shown in Table 8.

TABLE 8

| | Kind of $Al_2O_3$ Powder | $Y_2O_3/ZrO_2$ Molar Ratio | $Al_2O_3$ (wt. %) | Density of Sintered Body (g/cm³) | Average Grain Size (μm) | $ZrO_2$ Crystal Phase | Bending Strength (MPa) |
|---|---|---|---|---|---|---|---|
| Products of Present Invention | A | 2 | 10 | 5.79 | 0.5 | Tetragonal | 2200 |
| | | 2 | 20 | 5.51 | " | Tetragonal | 2510 |
| | | 2 | 40 | 5.02 | " | Tetragonal | 1810 |
| Comparative Products | B | 2 | 10 | 5.78 | 0.5 | Tetragonal | 1520 |
| | | 2 | 20 | 5.50 | " | Tetragonal | 1370 |
| | | 2 | 40 | 5.00 | " | Tetragonal | 1210 |

EXAMPLE 9

A Y—PSZ powder containing 1.5 to 5 mole% of $Y_2O_3$ and having a primary grain size of 230 angstroms, which was obtained by co-precipitation, was wet-mixed in ethanol for 24 hours with a high-purity (99.99%) $Al_2O_3$ powder having an average grain size of 0.4 μm to obtain a desired composition. The powdery mixture was then dried to obtain a starting powder. The starting powder was molded into a plate having a thickness of 4 mm, a width of 40 mm and a length of 56 mm according to a rubber press method. The molded plate was preliminarily sintered at a temperature of 1200° C. to 1500° C. for 2 hours to obtain a preliminarily sintered body to be subjected to the HIP treatment. The preliminarily sintered body had a relative density of 90 to 98% and an average grain size of 0.3 to 1.2 μm. This preliminarily sintered body was subjected to the HIP treatment under a pressure of 50 to 200 MPa at a temperature of 1300° C.

to 1700° C. for 0.5 hour in an argon gas to obtain a zirconia type sintered body of the present invention. With respect to 24 sintered bodies thus-obtained, the density, average grain size, $ZrO_2$ crystal phase and bending strength were measured. The obtained results are shown in Table 9. For comparison, data of a sintered body formed by subjecting a preliminarily sintered body composed solely of Y—PSZ to the HIP treatment and a sintered body of the Y—YSZ—$Al_2O_3$ type formed without performing the HIP treatment are shown in Table 9.

When the sintered bodies of the present invention were examined by an electron microscope, pores having a size larger than 30 μm were not found in each sintered body.

EXAMPLE 10

The mixed powder of Y—PSZ and $Al_2O_3$ used in Example 9 was molded into a square rod (5 mm×5 mm×56 mm) under a pressure of 3 ton/cm² according to a rubber press method. The molded rod was wrapped with a molybdenum film placed in a Pyrex glass tube and vacuum-sealed therein. The molded rod sealed in the glass capsule was placed in a HIP treatment apparatus where the rod was heated at 800° C. in an argon atmosphere. Then, compression was started and the HIP treatment was carried out at 1500° C. under 100 MPa for 0.5 hour. The obtained sintered body was ground by a diamond wheel and the bending strength was measured according to the above-mentioned method. The obtained results are shown in Table 10.

TABLE 10

| $Y_2O_3/ZrO_2$ Molar Ratio | $Al_2O_3$ (wt. %) (% by weight) | HIP Temperature (°C.) | HIP Pressure (MPa) | Density of Sintered Body (g/cm³) | Average Grain size (μm) | $ZrO_2$ Crystal Phase* | Bending Strength (MPa) |
|---|---|---|---|---|---|---|---|
| 2/98 | 5 | 1500 | 100 | 5.94 | 0.5 | T | 1770 |
| " | 10 | " | " | 5.78 | " | T | 2050 |
| " | 20 | " | " | 5.51 | " | T | 2300 |
| " | 30 | " | " | 5.25 | " | T | 1920 |
| 2.5/97.5 | 20 | " | " | 5.51 | " | T + C | 2010 |
| 2.5/97.5 | 40 | " | " | 5.01 | " | T + C | 1710 |

*T: Tetragonal system; C: Cubic system

EXAMPLE 11

A Y-PSZ powder containing MgO, $Dy_2O_3$ or $CeO_2$ in addition to $Y_2O_3$ and having an average grain size of 200 angstroms was prepared by co-precipitation. The obtained powder was wet-mixed with an $Al_2O_3$ powder having an average primary grain size of 1000 angstroms for 72 hours to obtain a desired composition. The obtained powder was molded and sintered in the same manner as described in Example 9 to obtan a zirconia type sintered body of the present invention. The results of the sintered body thus-obtained are shown in Table 11.

TABLE 9

| | $Y_2O_3/ZrO_2$ Molar Ratio | $Al_2O_3$ (wt. %) | Preliminary Sintering Temperature (°C.) | HIP Temperature (°C.) | HIP Treatment Pressure (MPa) | Density of Sintered Body (g/cm³) | Average Grain Size (μm) | Crystal Phase* | Bending Strength (MPa) |
|---|---|---|---|---|---|---|---|---|---|
| Products of Present Invention | 1.5/98.5 | 10 | 1400 | 1500 | 100 | 5.78 | 0.5 | T | 1780 |
| | 2/98 | 2 | 1400 | 1500 | 100 | 6.03 | 0.5 | T | 1730 |
| | " | 5 | 1400 | 1500 | 100 | 5.94 | 0.5 | T | 1820 |
| | " | 10 | 1400 | 1500 | 100 | 5.78 | 0.5 | T | 2200 |
| | " | 20 | 1200 | 1300 | 100 | 5.49 | 0.1 | T | 1700 |
| | " | 20 | 1300 | 1400 | 100 | 5.50 | 0.2 | T | 1750 |
| | " | 20 | 1400 | 1400 | 100 | 5.50 | 0.2 | T | 2010 |
| | " | 20 | 1400 | 1500 | 50 | 5.51 | 0.5 | T | 2410 |
| | " | 20 | 1400 | 1500 | 100 | 5.51 | 0.5 | T | 2510 |
| | " | 20 | 1400 | 1500 | 200 | 5.51 | 0.5 | T | 2430 |
| | " | 20 | 1400 | 1600 | 100 | 5.51 | 1.0 | T | 2440 |
| | " | 20 | 1400 | 1700 | 100 | 5.51 | 1.9 | T | 2050 |
| | " | 20 | 1500 | 1500 | 100 | 5.51 | 0.5 | T | 2380 |
| | " | 30 | 1500 | 1500 | 100 | 5.25 | 0.5 | T | 1900 |
| | " | 40 | 1500 | 1500 | 100 | 5.02 | 0.5 | T | 1810 |
| | " | 50 | 1500 | 1500 | 100 | 4.80 | 0.5 | T | 1700 |
| | 3/97 | 2 | 1400 | 1500 | 100 | 6.03 | 0.5 | T + C | 1820 |
| | " | 10 | 1400 | 1500 | 100 | 5.78 | 0.5 | T + C | 2080 |
| | " | 20 | 1400 | 1500 | 100 | 5.51 | 0.5 | T + C | 2500 |
| | " | 30 | 1400 | 1500 | 100 | 5.25 | 0.5 | T + C | 2310 |
| | " | 40 | 1500 | 1500 | 100 | 5.02 | 0.5 | T + C | 2230 |
| | " | 50 | 1500 | 1500 | 100 | 4.81 | 0.5 | T + C | 2210 |
| | 4/96 | 20 | 1400 | 1500 | 100 | 5.50 | 0.5 | T + C | 1920 |
| | 5/95 | 20 | 1400 | 1500 | 100 | 5.50 | 0.5 | T + C | 1790 |
| Comparative Products | 2/98 | 0 | 1400 | 1500 | 100 | 6.10 | 0.5 | T | 1470 |
| | 3/97 | 0 | 1400 | 1500 | 100 | 6.09 | 0.5 | T + C | 1650 |
| | 4/96 | 0 | 1400 | 1500 | 100 | 6.06 | 0.5 | T + C | 920 |
| | 2/98 | 10 | 1400 | Not effect | Not effect | 5.75 | 0.2 | T | 1070 |
| | " | 20 | 1400 | " | " | 5.48 | 0.2 | T | 910 |
| | " | 30 | 1400 | " | " | 5.20 | 0.2 | T | 850 |
| | " | 40 | 1400 | " | " | 5.00 | 0.2 | T | 810 |

*T; Tetragonal C; Cubic

TABLE 11

| Kind and Amount of Stabilizer (mole %) | $Al_2O_3$ (wt. %) | Preliminary Sintering Temperature (°C.) | HIP temperature (°C.) | HIP Pressure (MPa) | Density of Sintered Body (g/cm³) | Average Grain Size (μm) | $ZrO_2$ Crystal Phase* | Bending Strength (MPa) |
|---|---|---|---|---|---|---|---|---|
| $Y_2O_3(2)$ + MgO(0.5) | 20 | 1400 | 1500 | 100 | 5.51 | 0.5 | T | 2210 |
| $Y_2O_3(1.5)$ + $Dy_2O_3(1)$ | 20 | 1400 | 1500 | 100 | 5.53 | 0.5 | T | 2060 |
| $Y_2O_3(2)$ + $CeO_2(2)$ | 20 | 1400 | 1500 | 100 | 5.54 | 0.5 | T | 2100 |

*T: Tetragonal system

EXAMPLE 12

With respect to the sintered body prepared according to the method described in Example 9, the bending strength was measured at room temperature and high temperatures of up to 1000° C. The obtained results are shown in Table 12.

TABLE 12

| $Y_2O_3/ZrO_2$ Molar Ratio | $Al_2O_3$ (wt. %) | Preliminary Sintering Temperature (°C.) | HIP Treatment Conditions | | Bending Strength (MPa) | | | |
|---|---|---|---|---|---|---|---|---|
| | | | Temperature (°C.) | Pressure (MPa) | Room temperature | 600° C. | 800° C. | 1000° C. |
| 3/97 | 20 | 1400 | 1500 | 100 | 2200 | 1400 | 1130 | 980 |
| 3/97 | 30 | 1400 | 1500 | 100 | 2160 | 1420 | 1160 | 980 |
| 3/97 | 40 | 1400 | 1500 | 100 | 2100 | 1300 | 1120 | 920 |

We claim:

1. A process for the preparation of a zirconia type sintered body having a three point bending strength of at least 1700 MPa, which comprises the steps of:
    molding a powdery composition consisting essentially of 50 to 98% by weight of (a1) a powder of zirconia containing 1.5 to 5 mole% of yttria, having an average primary particle size not larger than 0.1 μm, or (a2) a mixture comprising 1.5 to 5 mole% of a yttria powder having an average primary particle size not larger than 0.5 μm and 95 to 98.5 mole% of a zirconia powder having an average primary particle size not larger than 0.1 μm, and 2 to 50% by weight of (b) an α-alumina powder having a specific surface area smaller than 20 m²/g and an average primary particle size of 0.2 to 0.4 μm;
    preliminarily sintering the molded powdery mixture to obtain a preliminarily sintered product composed of grains having an average particle size not larger than 1.5 μm; and
    isostatically hot-pressing the preliminarily sintered product under pressure of at least 50 MPa at a temperature of 1300° C. to 1700° C., whereby said zirconia type sintered body having a three point bending strength of at least 1700 MPa is obtained.

2. A process according to claim 1, wherein the powdery mixture is filled in a capsule and then subjected to the hot isostatic pressing treatment.

3. A process according to claim 1, wherein the hot isotactic pressing treatment is carried out under pressure of 50 MPa to 500 MPa.

4. A process according to claim 1, wherein said powdery composition is prepared by adding ammonium carbonate to an aqueous solution containing (a) zirconium, (b) yttrium as a stabilizer and (c) aluminum, aluminum and magnesium, or aluminum and silicon, said elements being in the form of salts, organic metal compounds or oxides of said elements, and thermally decomposing the formed precipitate.

5. A process according to claim 4, wherein the ammonium carbonate is added at one time to the starting aqueous solution with violent stirring so that the pH value of the solution is about 9.

6. A process according to claim 4, wherein the precipitate is thermally decomposed in an air atmosphere at 900° C. to 1150° C.

7. A process according to claim 4, wherein the prepared powdery composition has an average primary particle size of not larger than 0.1 μm.

8. A process according to claim 4, wherein the molded powdery composition is preliminarily sintered at a temperature not higher than 1500° C.

9. A process according to claim 4, wherein the hot isostatic pressing treatment is carried out under a pressure of 50 MPa to 500 MPa.

* * * * *